(12) United States Patent
Froehlich et al.

(10) Patent No.: US 8,139,489 B2
(45) Date of Patent: Mar. 20, 2012

(54) ROBUST JITTER-FREE REMOTE CLOCK OFFSET MEASURING METHOD

(75) Inventors: Steven Froehlich, Danbury, CT (US); Michel H. T. Hack, Cortlandt Manor, NY (US); Xiaoqiao Meng, Mount Kisco, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 12/186,588

(22) Filed: Aug. 6, 2008

(65) Prior Publication Data

US 2010/0034103 A1 Feb. 11, 2010

(51) Int. Cl.
*G01R 31/08* (2006.01)
(52) U.S. Cl. ........ 370/235; 370/252; 370/253; 370/394; 370/519; 709/203; 709/224; 709/230
(58) Field of Classification Search .......... 370/229, 370/235, 252, 253, 503, 509, 516, 517, 519; 709/201–203, 223–237
See application file for complete search history.

(56) References Cited

U.S. PATENT DOCUMENTS

| | | | |
|---|---|---|---|
| 5,553,222 A | 9/1996 | Milne et al. ............... 715/201 |
| 6,928,473 B1 * | 8/2005 | Sundaram et al. ........... 709/224 |
| 6,957,357 B2 | 10/2005 | Liu et al. .................. 713/503 |
| 7,072,432 B2 | 7/2006 | Belcea | |
| 7,092,410 B2 * | 8/2006 | Bordonaro et al. .......... 370/516 |
| 7,103,514 B1 | 9/2006 | Carlson et al. ............. 702/189 |
| 7,194,649 B2 | 3/2007 | Liu et al. .................. 713/400 |
| 7,590,151 B2 * | 9/2009 | Middleton et al. ........... 370/516 |
| 2002/0039371 A1 * | 4/2002 | Hedayat et al. ............. 370/516 |
| 2002/0136335 A1 | 9/2002 | Liou et al. ................. 375/354 |
| 2004/0062280 A1 * | 4/2004 | Jeske et al. ................ 370/517 |
| 2006/0206558 A1 * | 9/2006 | Cohen et al. ............... 709/201 |
| 2006/0269029 A1 | 11/2006 | Repko et al. ............... 375/356 |

(Continued)

FOREIGN PATENT DOCUMENTS

EP 0697774 A1 8/1994

(Continued)

OTHER PUBLICATIONS

Prabir Barooah et al., "Recursive Time-Synchronization In Sensor Networks", MILCOM 2008, IEEE, Military Communications Conference 2008, IEEE.

(Continued)

*Primary Examiner* — Christopher Grey
(74) *Attorney, Agent, or Firm* — Harrington & Smith

(57) ABSTRACT

A clock offset between a client and a server is measured by: (a) the client sending a request to the server; (b) upon receiving the request in step (a), the server optionally sending a server acknowledgement to the client; (c) upon the client receiving the server acknowledgement in step (b) or directly, if no acknowledgement was used, each of the client and the server proceeding to concurrently exchange their respective timestamps with each other a multiplicity (n) of times, thus forming a multiplicity (n) of timestamp exchanges; and (d) determining a plurality of apparent forwards and backwards delays based on the multiplicity (n) of timestamp exchanges. The preferred apparent forwards and backwards delays are then selected based on the minimum values (for each direction) determined in (d) above. The clock offset between client and server is then determined based on the preferred apparent forwards and backwards delays.

25 Claims, 5 Drawing Sheets

U.S. PATENT DOCUMENTS

| | | | |
|---|---|---|---|
| 2007/0061607 A1 | 3/2007 | Carlson et al. | 713/503 |
| 2007/0086489 A1* | 4/2007 | Carlson et al. | 370/516 |
| 2007/0121523 A1* | 5/2007 | Morandin | 370/252 |
| 2007/0186279 A1* | 8/2007 | Zimmer et al. | 726/9 |
| 2008/0151771 A1* | 6/2008 | Dowse | 370/252 |
| 2009/0052431 A1 | 2/2009 | Kroener et al. | 370/350 |
| 2010/0138187 A1 | 6/2010 | Dzung et al. | 702/176 |
| 2010/0238917 A1 | 9/2010 | Silverman et al. | 370/350 |
| 2011/0106968 A1* | 5/2011 | Froehlich et al. | 709/232 |

FOREIGN PATENT DOCUMENTS

| | | |
|---|---|---|
| WO | WO 2005/002100 A1 | 1/2005 |
| WO | WO 2008/138850 A1 | 11/2008 |

OTHER PUBLICATIONS

Wikipedia, "Precision Time Protocol"; http://en.wikipedia.org/wiki/Precision_Time_Protocol; Categories: Synchronization/IEC standards/IEEE standards/Network time-related software; modified Sep. 13, 2009.

NIST, National Institute of Standards and Technology, IEEE 1588 Website; ISPCS-2009 Brescia, Italy, Oct. 12-16, 2009, IEEE 1588-2008 available from IEEE Standards Association; http://ieee1588.nist.gov; Updated Dec. 10, 2008.

\* cited by examiner

ROBUST JITTER-FREE REMOTE CLOCK OFFSET MEASURING METHOD

TECHNICAL FIELD

The present invention generally concerns methods and apparatus for measuring a remote clock offset with very low jitter.

BACKGROUND

It is widely held that software-only solutions to clock synchronization suffer from inevitable "system noise" (process dispatching, interrupt handling etc.) that limit accuracy to 10 microseconds or worse. When microsecond-level synchronization is needed, hardware solutions are employed, e.g., network adapters with IEEE 1588 (Precise Time Protocol) support at both ends of the communications link.

As depicted in FIG. 1A, the typical software timestamp exchange has client node A send a timestamp T1 to server node B, which receives it at time T2. Server node B then sends a reply at time T3, and client node A receives it at time T4. T1 and T4 are measured using client node A's clock; T2 and T3 are measured on server node B's clock. From this information the offset between the clocks of client A and server B can be determined—but software as well as hardware delays contribute to high jitter. IEEE 1588 takes the timestamps at the hardware level, and provides an interface to collect those timestamps.

SUMMARY OF THE INVENTION

The present invention is directed to a method of robust jitter-free remote clock offset measuring.

In a first aspect of the invention, a clock offset between a client and a server is measured by:

(a) the client sending a request to the server;

(b) upon receiving the request in step (a), the server optionally sending a server acknowledgement to the client;

(c) upon the client receiving the server acknowledgement in step (b) or directly, if no acknowledgement was used, each of the client and the server proceeding to concurrently exchange their respective timestamps with each other a multiplicity (n) of times, thus forming a multiplicity (n) of timestamp exchanges; and (d) determining a plurality of apparent forwards and backwards delays based on the multiplicity (n) of timestamp exchanges.

The preferred apparent forwards and backwards delays are then selected based on the minimum values (for each direction) determined in (d) above.

The clock offset between client and server is then determined based on the preferred apparent forwards and backwards delays.

The foregoing summary of the various embodiments of the present invention is exemplary and non-limiting. For example, one with ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Invention, when read in conjunction with the attached Drawing Figures, wherein:

FIG. 1A depicts an existing timestamp exchange method known in the prior art;

FIG. 1B depicts the same four-timestamp protocol, but in the way that matches the logical sequence used in the present invention;

FIG. 1C depicts the timestamp exchange protocol actually used in the present invention;

FIG. 2 depicts a flow diagram 200 for the invention;

FIG. 3 depicts the protocol as seen from the point of view of the client and server sides running concurrently; and FIG. 4 depicts overlapping pingpong exchanges, where the normal FIG. 3 pattern is disturbed by a left-over pingpong packet from an earlier incomplete exchange.

FIG. 5 depicts a hardware block diagram of the client 100 and the server 400. As shown, the client 100 includes a processor 101 arranged to access a memory 103, where the memory 103 includes a computer program 102. Likewise, the server 400 includes a processor 401 arranged to access a memory 403, where the memory 403 includes a computer program 402.

DETAILED DESCRIPTION OF THE INVENTION

Briefly, a clock offset between a client and a server is measured as follows:

(a) the client sends a request for a "pingpong exchanger" to the server (who is waiting for this request passively, i.e. not consuming resources).

(b) upon receiving the request of step (a), the server optionally sends an acknowledgement to the client (who is also waiting passively, if this step is used). Whether or not an acknowledgement is sent, the server enters an active wait loop for the client's first pingpong packet.

(c) upon the client receiving the acknowledgement of step (b), or immediately after step (a) if step (b) did not involve an acknowledgement, the client starts the pingpong exchange by sending the first pingpong packet to the server and then waiting actively for a reply. Both client and server perform an agreed-upon number of pingpong exchanges. Each pingpong packet includes at least the timestamp at which it was sent.

(d) The apparent forwards and backwards delays are computed for each timestamp exchange, forming a multiplicity of (n) apparent forwards and backwards delays.

The preferred apparent forwards and backwards delays are then selected based on the minimum values (for each direction) determined in (d) above.

The clock offset between client and server is then determined based on the preferred apparent forwards and backwards delays.

The server acknowledgement step (b) above is optional, because it offers a tradeoff between the client spending extra time waiting actively for the server's first pingpong reply, and the server spending extra time waiting actively for the client's first pingpong packet.

In contrast to existing techniques, the present invention avoids system noise and high jitter by using a novel protocol that leads both sides of a timestamp exchange to run physically concurrently, which makes it possible to exploit a stretch of time that happens to be free from system noise. As a result, the shortest round-trip time among several consecutive timestamp exchanges (each of which may take tens of microseconds over current communication fabrics such as 1 G Ethernet, InfiniBand, etc.), can determine the clock offset with very low fitter.

The present invention can also address the send-receive asymmetry in the timing exchanges (as opposed to link-delay asymmetry).

Figure 1A:
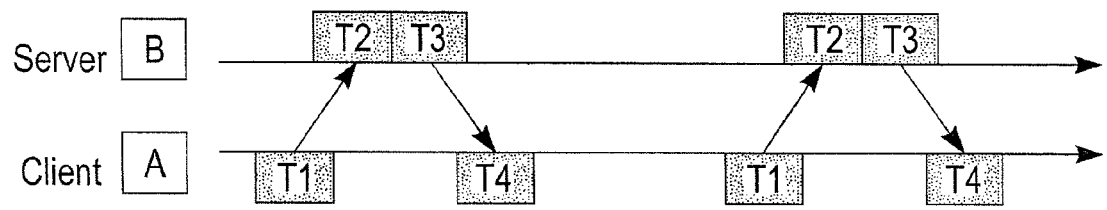
Figure 1B:
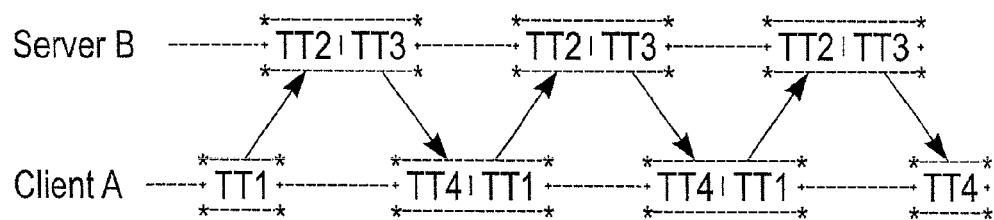
Figure 1C:
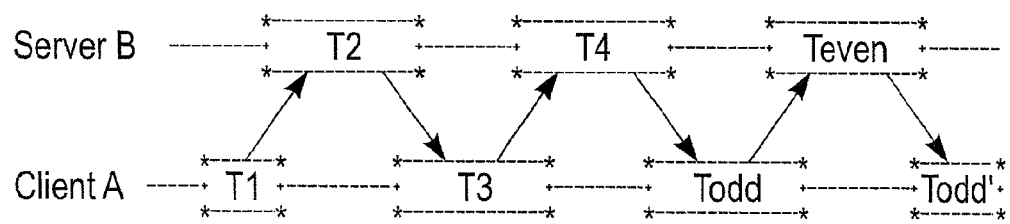

Referring now to FIG. 1C, there is depicted the timestamp exchange protocol actually used in the present invention.

Figure 2:
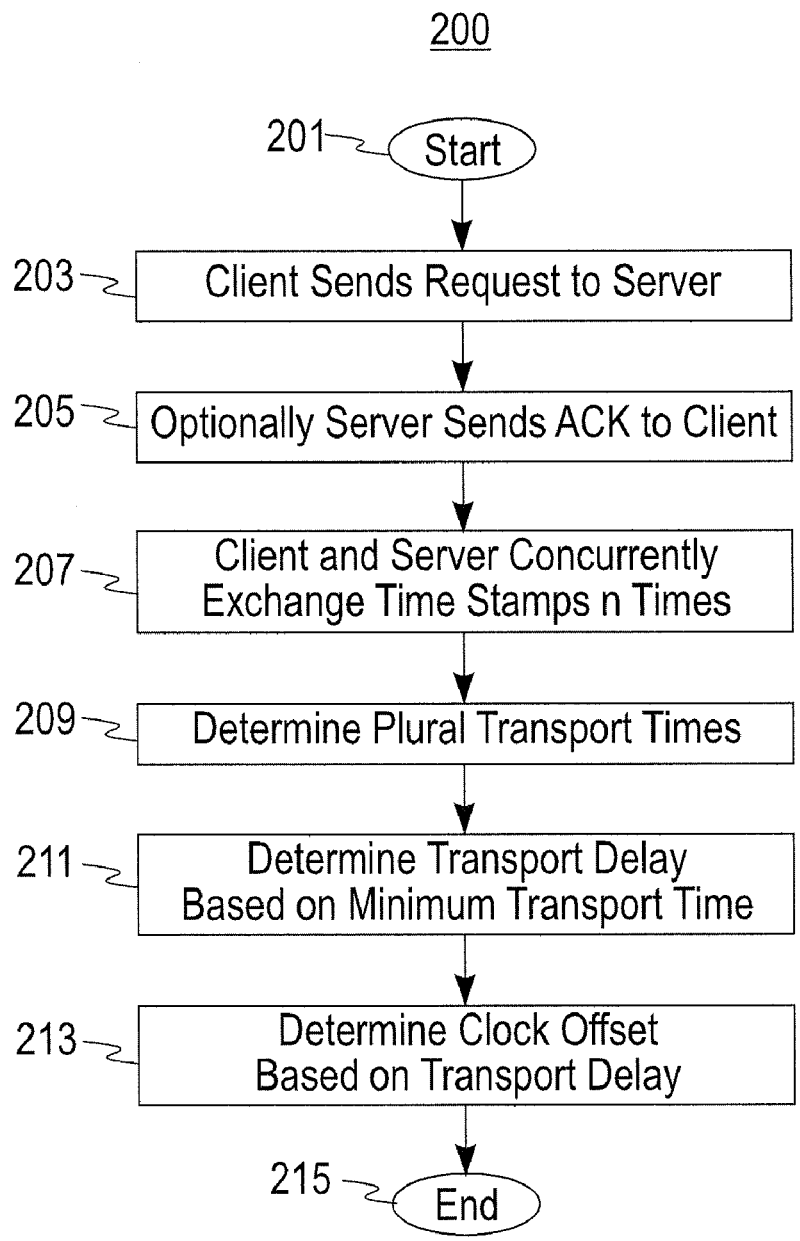

Moreover, referring generally to FIG. 2, there is shown a flow diagram 200 for the present method.

The method 200 comprises the following steps:

After starting, step 201, the method goes to step 203.

In step 203, the client initiates the process by sending a request to the server. The process then goes to step 205 or else directly to step 207 if step 205 is not used.

In optional step 205, upon receiving the request sent in step 203, the server sends a server acknowledgement to the client. The process then goes to step 207.

In step 207, upon the client receiving the foregoing server acknowledgement from step 205 or else directly if step 205 is not used, each of the client and the server proceed to concurrently exchange their respective timestamps with each other a multiplicity (n) of times, thus forming a multiplicity (n) of timestamp exchanges. (This is described as a "pingpong" timestamp exchange below.) The process then goes to step 209.

In step 209, the process determines a plurality of apparent forwards and backwards delays based on the multiplicity (n) of timestamp exchanges in step 207. The process then goes to step 211.

In step 211, the preferred apparent forwards and backwards delays are then selected based on the minimum values (for each direction) that are determined in step 209. The process then goes to step 213.

In step 213, the process then determines the client or server clock offset based on the preferred apparent forwards and backwards delays determined in step 211.

In step 915, the process ends.

Still referring to FIG. 2, in various embodiments the multiplicity (n) of timestamp exchanges varies from 4 to 10.

Also, as described below, in various embodiments the process 200 includes determining a plurality of client-to-server (or "forwards") apparent delays based on the multiplicity (n) of timestamp exchanges in step 207.

Further, as described below, in various embodiments the process 200 includes determining the forwards transport delay based on the minimum forwards apparent delay of the plurality of forward apparent delays.

Also, as described below, in various embodiments the process 200 includes determining a plurality of server-to-client (or "backwards") apparent delays based on the multiplicity (n) of timestamp exchanges in step 207.

Furthermore, as described below, in various embodiments the process 200 includes determining the backwards transport delay based on the minimum backwards apparent delay of the plurality of backwards apparent delays.

Also, as described below, in various embodiments the process 200 uses Remote Direct Memory Access to reduce system noise.

Further, in various embodiments the determining steps 209, 211 and 213 are performed by the client.

Also, in various embodiments, the determining steps 209, 211 and 213 are performed by the server.

Moreover, in various embodiments, any of the determining steps 209, 211 and 213 are performed by any of the client and the server.

Figure 3:
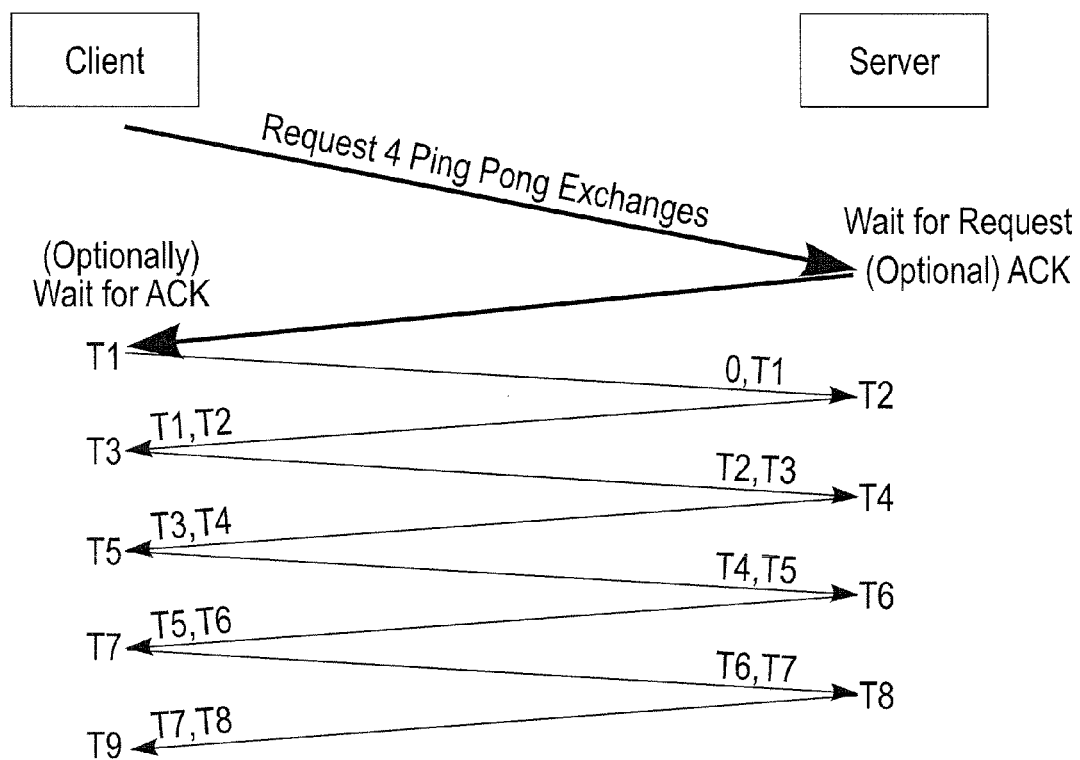
Figure 4:
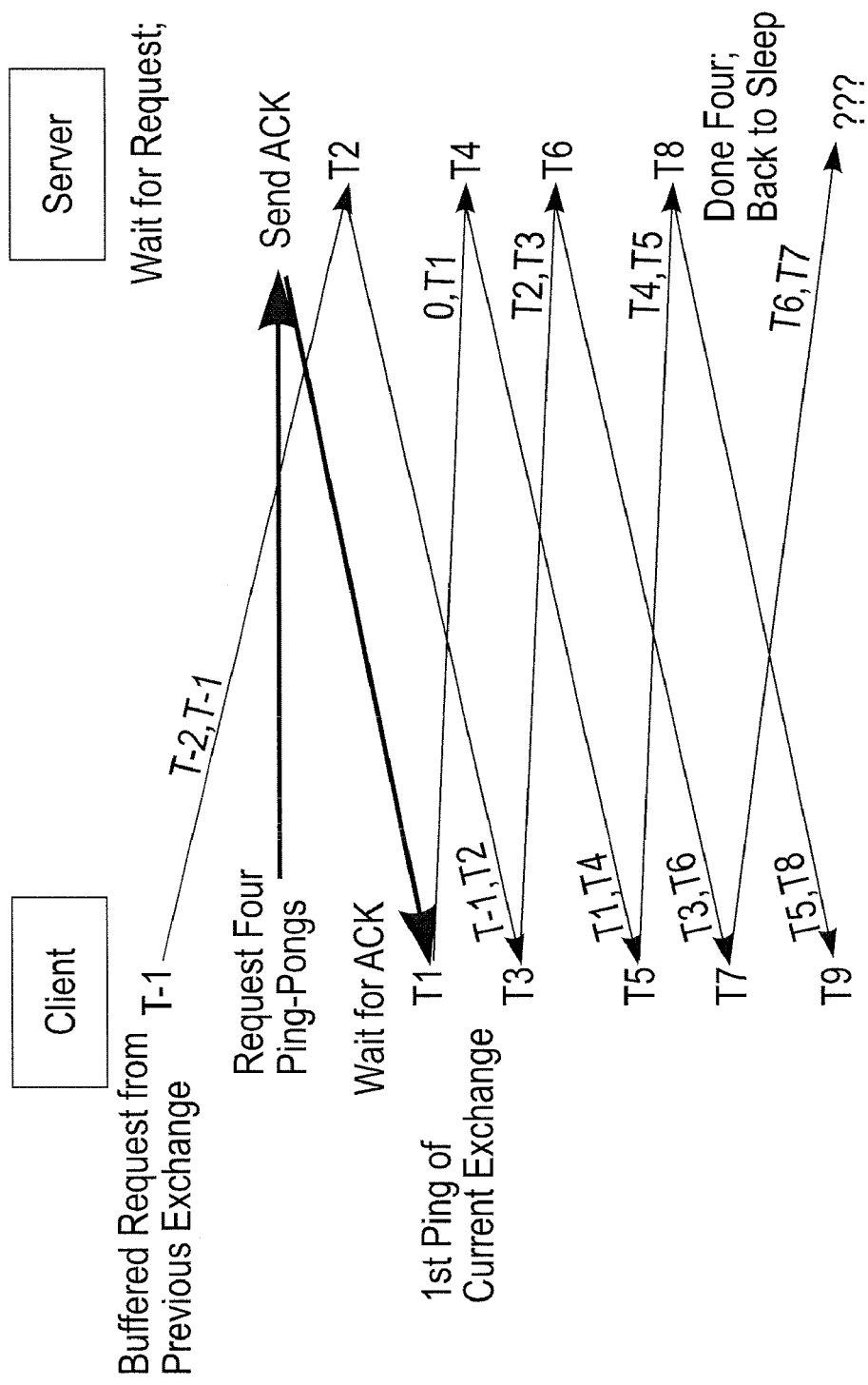
Figure 5:
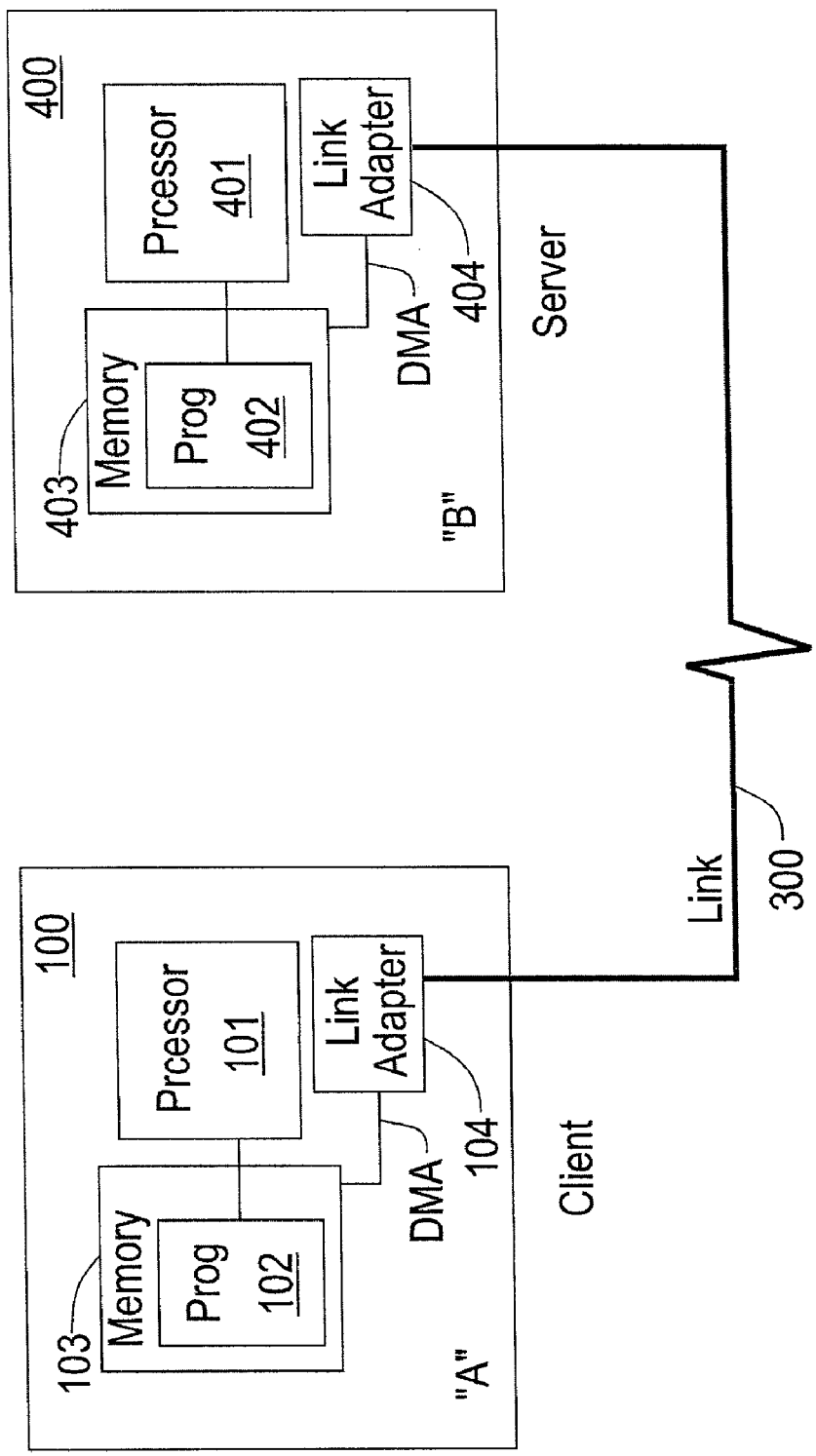

Referring now generally to FIGS. 3-4, if a client wants to track the clock of a server, in accordance with the process 200 described above in connection with FIG. 2, the client repeatedly requests a timestamp exchange in order to measure the current clock offset, and from a history of such measurements and appropriate filtering techniques it can then steer its clock to match that of the server. This might be done a few times per second, so that if the local oscillator's frequency is stable to one or two ppm, offsets can be controlled at the microsecond level.

Referring now to FIG. 3 there is shown an embodiment of "pingpong" timestamp exchanges, in accordance with the present invention.

As shown in FIG. 3, the client initiates such an exchange by requesting some number of "pingpong" timestamp exchanges (typically half a dozen) from the server, and the server acknowledges this request. This request and its acknowledgement can be sent over a regular socket interface, as timing is not yet critical. Both server and client then enter a tight loop, with the client sending first and the server receiving first, transferring timestamps T1, T2, . . . , T2n, with odd indices denoting timestamps taken on the client and even indices denoting server timestamps. Each triplet T(i), T(i+1), T(i+2) is a condensed version of the typical four-timestamp exchange where the middle two are fused together. The difference between successive odd timestamps expresses the round-trip time as seen from the client, and the difference between successive even timestamps expresses the round-trip time as seen from the server.

The point of the repeated exchanges is to make the software go through the same path multiple times, which prime caches and TLBs, and to offer a choice of triplets from which to extract the clock offset. Indeed, with Convex Hull filtering techniques the forwards and backwards delays (difference between adjacent timestamps, e.g., Teven–Todd (T2–T1) for the forwards delay, and Todd–Teven (T3–T2) for the backwards delay) can be advantageously collected separately, and any system noise would be filtered out.

In various embodiments, for example as depicted in FIGS. 3 and 4, in order to recover from possible lost or delayed packets, it is advantageous to include a second timestamp in each pingpong packet, namely the "sent" timestamp of the packet to which this one is a reply. (A dummy value of zero would be used in the first pingpong packet, since that one is not in reply to another pingpong packet.). These timestamp pairs are shown alongside the arrows denoting the pingpong packets in FIGS. 3 and 4, in the form (Ta, Tb) where Tb is the primary timestamp of when the packet was sent, and Ta is a copy of the Tb of the packet to which this is a reply. Note that in a pingpong exchange, every packet other than the first is a reply to another pingpong packet, whether sent by the client or by the server.

This additional timestamp makes it easy to match replies to the packets sent, so as to extract consistent apparent delays even in the presence of interference, as depicted in FIG. 4. FIG. 4 depicts overlapping pingpong exchanges, where the normal FIG. 3 pattern is disturbed by a left-over pingpong packet from an earlier incomplete exchange. (FIG. 3 shows the normal case, without interference.)

Note that other error recovery techniques may be used that avoid the need for this secondary timestamp, e.g. flushing the communication channel after any timeout error, so as to guarantee (by transmission protocol properties) that the packets will automatically be matched.

An essential component of the invention is the initial message from the client to server, this initial message being depicted as step 203 in FIG. 2, requesting that the server enter a ping-pong timestamp exchange, with the client entering the pingpong timestamp exchange either directly, or upon receipt from the server of an acknowledgement (depicted as optional step 205 in FIG. 2). Any particular embodiment either does or does not exercise the acknowledgement option, as this is a design tradeoff. The purpose of this step 203 and step 205 "handshake" is to get both client process and server process to run physically at the same time, on different machines.

This "doorbell" exchange is not as time-critical as the pingpong exchange, and might use a different transport mechanism (e.g. regular sockets instead of InfiniBand RDMA). The contents of the doorbell packet are also different—it may contain the number of pingpong packets that are to be exchanged, for example. For this reason the "doorbell" and its optional acknowledgement packet are depicted as thick arrows in FIGS. 3 and 4, to distinguish them from pingpong packets.

Moreover, the reason for this "doorbell" initial request is that timestamp exchanges do not run continuously (that would consume too much CPU resources for no additional benefit), but are initiated periodically, with a period that is typically much longer than normal dispatch intervals. As a result, the server is most likely sleeping when the request arrives. Indeed, the client would also have been sleeping until its alarm clock went off telling it to initiate another exchange. So both processes would have to wake up, and a lot of lookaside state (caches, pages, TLB entries) would be stale and have to be refreshed, which takes time—generally a quite variable amount of time. Even the first pingpong exchange is likely to continue to refresh lookaside information, but from then on both client and server will repeat the exact same software path and benefit from an up-to-date lookaside state.

Because the software path used in replying to the just-received packet is (after one respectively one-and-a-half repetitions) the same on the client side and on the server side, this technique also avoids skewing the offset determination by the asymmetry between sender and receiver encountered in traditional implementations.

In the case of Remote Direct Memory Access (RDMA), as available with InfiniBand for example, there is no need for system calls after the initial handshake, as each side can do spin-loop polling for the other side's update to show up in the direct-mapped communication buffer.

This cuts out the largest component of system noise completely.

RDMA can be exploited to cut out "system noise" almost completely (after filtering out unexpected interruptions). Most other mechanisms involve one or more system calls during a timestamp exchange, and even in the absence of unexpected interruptions the software path is sufficiently long, with sufficiently many imponderables (e.g., number of items on various kernel to-do lists), so as to increase variability and hence delay jitter.

It remains possible for unrelated interruptions to interfere (as this protocol typically runs at ordinary user level), but those would be automatically filtered out by the Convex Hull technique, which discards any delays that are larger than the locally-shortest delays. For the aforementioned Convex Hull Filtering technique see, for example, "Method and system for clock skew and offset estimation", by Scott Carlson, Michel Hack and Li Zhang, filed Sep. 9, 2005 in the USPTO as U.S. patent application Ser. No. 11/223,876, assigned to IBM Corporation.

In summary, in accordance with the invention, there is described a method for avoiding system noise when obtaining measurement data for clock synchronization. Accordingly, the invention uses a protocol that leads both sides of a times- tamp exchange to run physically concurrently, which makes it possible to exploit a stretch of time that happens to be free from system noise. Further, the protocol allows features such as RDMA to be used to cut out system noise even more effectively. Further, the protocol addresses the send-receive asymmetry in the timing exchanges. Also, the protocol can recover from possible lost or delayed packets.

Thus there is described the first aspect of the invention, namely, the method of measuring a clock offset between a client and a server by:
(a) the client sending a request to the server;
(b) upon receiving the request in step (a), the server optionally sending a server acknowledgement to the client;
(c) upon the client receiving the server acknowledgement in step (b) or directly, if no acknowledgement was used, each of the client and the server proceeding to concurrently exchange their respective timestamps with each other a multiplicity (n) of times, thus forming a multiplicity (n) of timestamp exchanges; and
(d) determining a plurality of apparent forwards and backwards delays based on the multiplicity (n) of timestamp exchanges.

The preferred apparent forwards and backwards delays are then selected based on the minimum values (for each direction) determined in (d) above.

The clock offset between client and server is then determined based on the preferred apparent forwards and backwards delays.

There also is described a second aspect of the invention, namely, a client configured to measure a clock offset with a server by a method comprising:
(a) sending a request to the serve;
(b) exchanging timestamps with the server a multiplicity (n) of times, thus forming a multiplicity (n) of timestamp exchanges; and
(c) determining a plurality of apparent forwards and backwards delays based on the multiplicity (n) of timestamp exchanges.

There is also described a third aspect of the invention, namely, a server configured to measure a clock offset with a client by a method comprising:
(a) receiving a request from the client;
(b) exchanging timestamps with the client a multiplicity (n) of times, thus forming a multiplicity (n) of timestamp exchanges; and
(c) determining a plurality of apparent forwards and backwards delays based on the multiplicity (n) of timestamp exchanges.

Finally, there also is described a fourth aspect of the invention, namely, a client and server configured for measuring a clock offset between the client and the server, comprising means for the client sending a request to the server; means for each of the client and the server proceeding to concurrently exchange their respective timestamps with each other a multiplicity (n) of times, thus forming a multiplicity (n) of timestamp exchanges; and means for determining a plurality of apparent forwards delays and apparent backwards delays based on the multiplicity (n) of timestamp exchanges.

In various embodiments the fourth aspect further includes means for selecting the preferred apparent forwards and backwards delays respectively based on the minimum values for each of the apparent forwards delays and apparent backwards delays.

In various embodiments the fourth aspect further includes means for determining a clock offset between the client and the server based on the preferred apparent forwards and backwards delays.

Thus it is seen that the foregoing description has provided by way of exemplary and non-limiting examples a full and informative description of the best apparatus and methods presently contemplated by the inventors for robust jitter-free remote clock offset measuring method. One skilled in the art will appreciate that the various embodiments described herein can be practiced individually; in combination with one or more other embodiments described herein; or in combination with methods and apparatus differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A method for measuring a clock offset between a client and a server, comprising:
   sending a request to the server to initiate a first pingpong exchange process having a first software path used in replying to a pingpong exchange packet received at the server, where the request identifies a multiplicity (n) of times that the second pingpong exchange process is to be performed and a software path is a path that software goes through when performing an action;
   initiating, in the client, a second pingpong exchange process having a second software path used in replying to a pingpong exchange packet received at the client, where the first software path is identical to the second software path after at least one and a half repetitions;
   exchanging timestamps with the server the multiplicity (n) of times using the second pingpong exchange process, thus forming the multiplicity (n) of timestamp exchanges; and
   determining a plurality of apparent forwards and backwards delays based on the multiplicity (n) of timestamp exchanges.

2. The method of claim 1 further comprising selecting preferred apparent forwards and backwards delays based on minimum values for each of the plurality of the apparent forwards and backwards delays determined.

3. The method of claim 2 further comprising a determining a clock offset between the client and the server based on the preferred apparent forwards and backwards delays.

4. The method of claim 1 further comprising using remote direct memory access to reduce system noise.

5. The method of claim 1, executed by the client.

6. The method of claim 1, further comprising, by the client, selecting preferred apparent forwards and backwards delays based on minimum values for each of the plurality of the apparent forwards and backwards delays determined.

7. The method of claim 6 further comprising, by the client, determining a clock offset between the client and the server based on the preferred apparent forwards and backwards delays.

8. The method of claim 1 as executed based on a computer program stored in a memory of the client.

9. The method of claim 1 further comprising, by the server, selecting the preferred apparent forwards and backwards delays based on minimum values for each of the plurality of the apparent forwards and backwards delays determined.

10. The method of claim 9 further comprising, by the server, determining a clock offset between the client and the server based on the preferred apparent forwards and backwards delays.

11. The method of claim 1, where initiating, in the client, the second pingpong exchange process further comprises refreshing at least one cache.

12. The method of claim 1, where the second pingpong exchange process comprises:
   receiving a first received pingpong exchange packet, where the first received pingpong exchange packet comprises a sent timestamp;
   generating a reply pingpong exchange packet comprising the sent timestamp and a reply timestamp; and
   sending the reply pingpong exchange packet.

13. The method of claim 12, where the reply timestamp indicates when the reply pingpong exchange packet was sent.

14. The method of claim 1, where determining the plurality of the apparent forwards and backwards delays further comprises filtering out at least one of the timestamp exchanges in the multiplicity (n) of timestamp exchanges.

15. The method of claim 14, where filtering out the at least one of the timestamp exchanges comprises filtering out timestamp exchanges where unrelated interruptions interfere with the timestamp exchange.

16. The method of claim 14, where filtering out the at least one of the timestamp exchanges comprises using Convex Hull filtering techniques.

17. The method of claim 1, where the second software path comprises spin-loop polling for a received pingpong exchange packet.

18. The method of claim 1, where the multiplicity (n) of times is at least six times.

19. The method of claim 1, where the request is sent using a first transport mechanism and the second pingpong exchange process uses a second, different transport mechanism.

20. An apparatus comprising:
   a processor; and
   a memory including computer program code, the memory and the computer program code configured to, with the processor, cause the apparatus to perform operations comprising at least the following:
   to send a request to a server to initiate a first pingpong exchange process having a first software path used in replying to a pingpong exchange packet received at the server, where the request identifies a multiplicity (n) of times that the second pingpong exchange process is to be performed and a software path is a path that software goes through when performing an action;
   to initiate, in the apparatus, a second pingpong exchange process having a second software path used in replying to a pingpong exchange packet received at the apparatus, where the first software path is identical to the second software path after at least one and a half repetitions;
   to exchange timestamps with the server the multiplicity (n) of times using the second pingpong exchange process, thus forming the multiplicity (n) of timestamp exchanges; and
   to determine a plurality of apparent forwards and backwards delays based on the multiplicity (n) of timestamp exchanges.

21. The apparatus of claim 20, the processor further configured to select preferred apparent forwards and backwards delays based on minimum values for each of the plurality of the apparent forwards and backwards delays determined.

22. The apparatus of claim 21, the processor further configured to determine a clock offset between the apparatus and the server based on the preferred apparent forwards and backwards delays.

23. An apparatus comprising a processor; and a memory including computer program code, the at least one memory and the computer program code configured to, with the processor, cause the apparatus to perform operations comprising at least the following:
  to receive a request from a client to initiate a first pingpong exchange process having a first software path used in replying to a pingpong exchange packet received at the apparatus,
  where the request identifies a multiplicity (n) of times that the first pingpong exchange process is to be performed and a software path is a path that software goes through when performing an action;
  initiating, in the apparatus, the first pingpong exchange process, where the first software path is, after at least one and a half repetitions, identical to a second software path used in replying to a pingpong exchange packet received at the client;
  to exchange timestamps with the client the multiplicity (n) of times using the first pingpong exchange process, thus forming the multiplicity (n) of timestamp exchanges; and
  to determine a plurality of apparent forwards and backwards delays based on the multiplicity (n) of timestamp exchanges.

24. The apparatus of claim 23, the processor further configured to select preferred apparent forwards and backwards delays based on minimum values for each of the plurality of the apparent forwards and backwards delays determined.

25. The apparatus of claim 24, the processor further configured to determine a clock offset between the client and the apparatus based on the preferred apparent forwards and backwards delays.

* * * * *